Jan. 15, 1929.
W. N. VANCE
1,698,974
BAR RACK
Filed Feb. 4, 1920    5 Sheets-Sheet 1
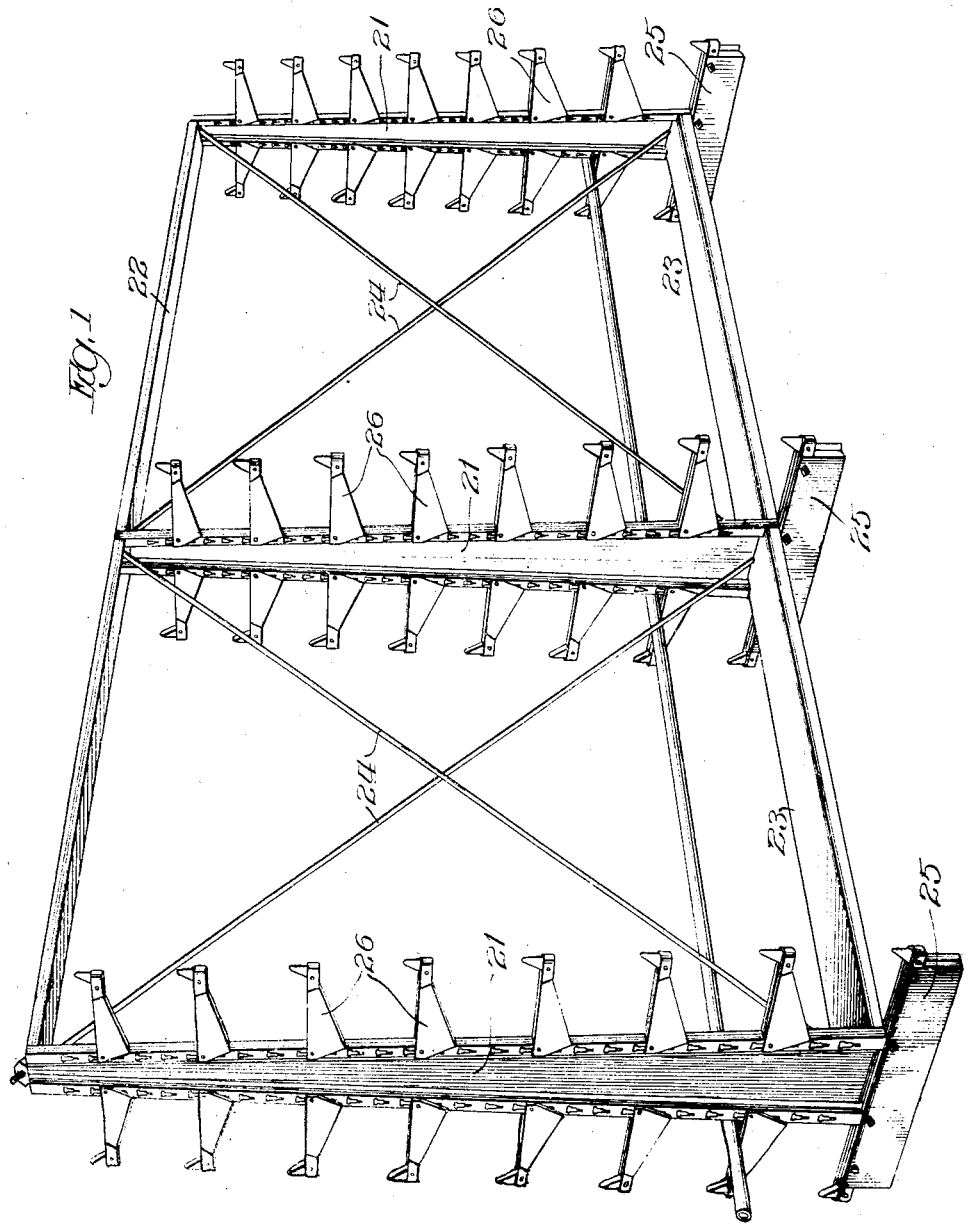

Jan. 15, 1929.
W. N. VANCE
1,698,974
BAR RACK
Filed Feb. 4, 1920      5 Sheets-Sheet 2
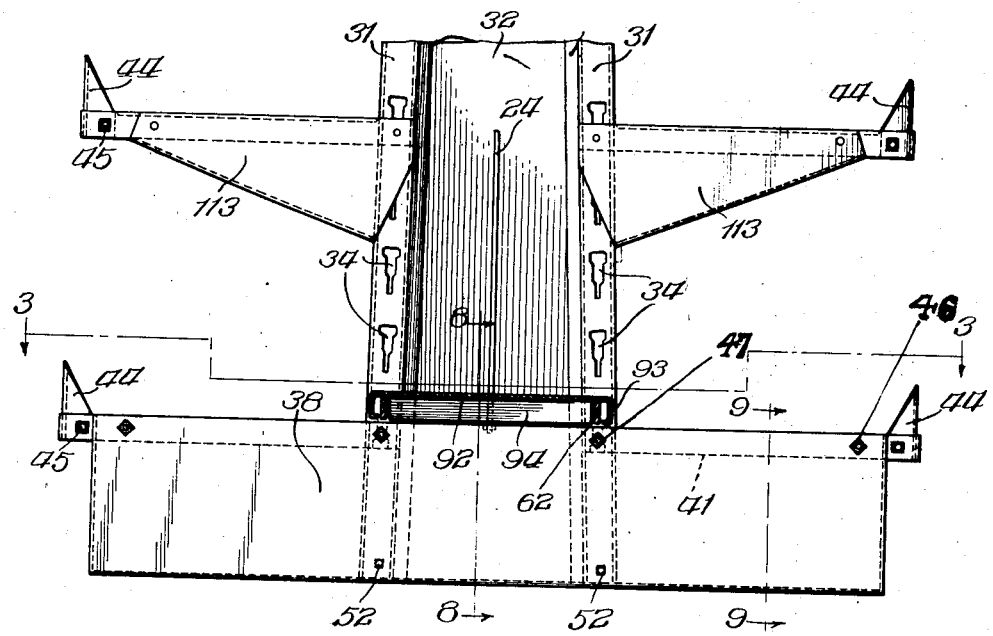
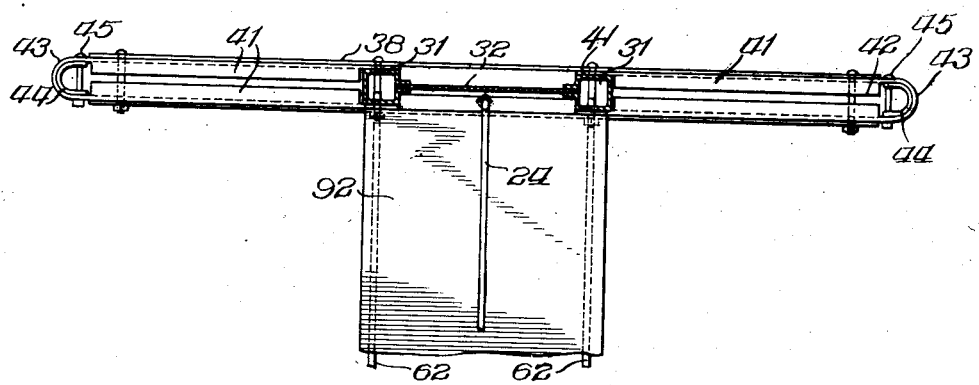

Jan. 15, 1929.  W. N. VANCE  1,698,974
BAR RACK
Filed Feb. 4, 1920    5 Sheets-Sheet 3
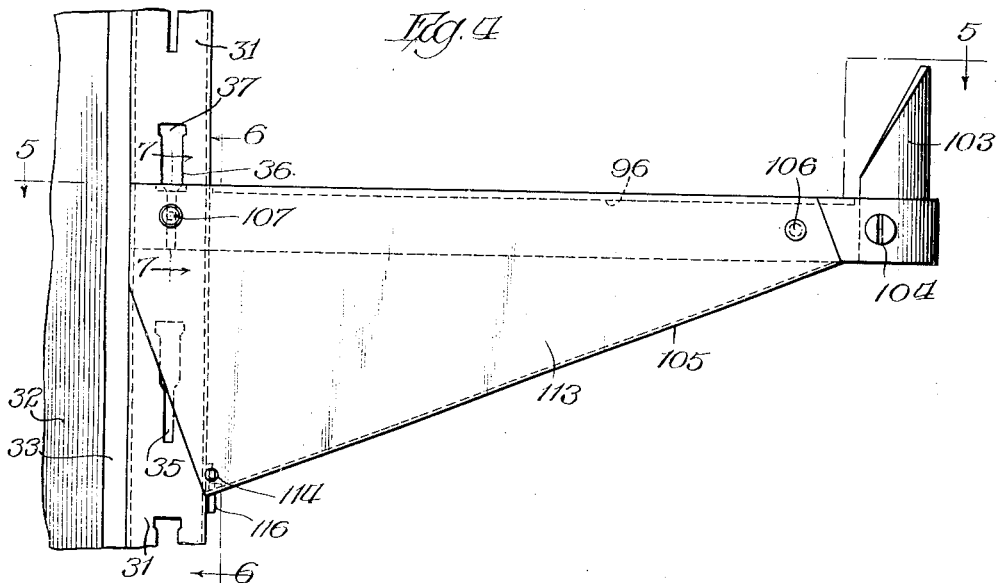
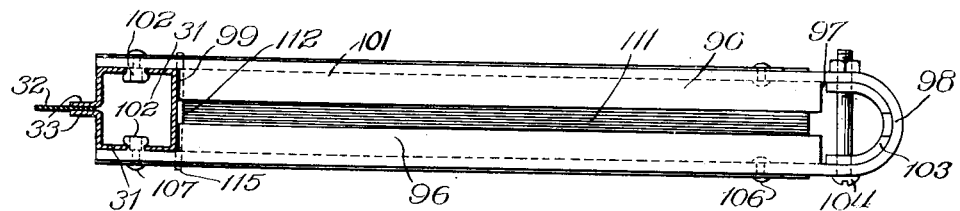
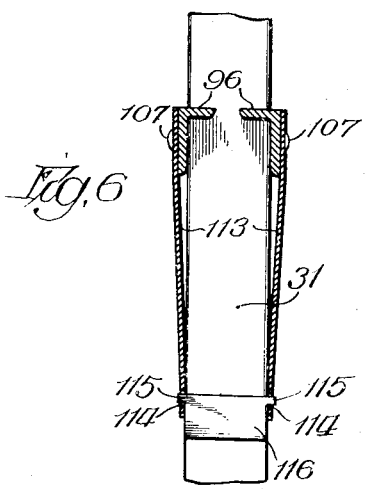 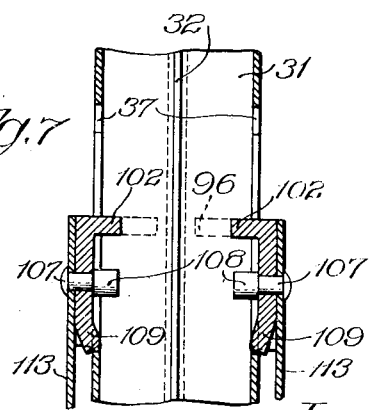

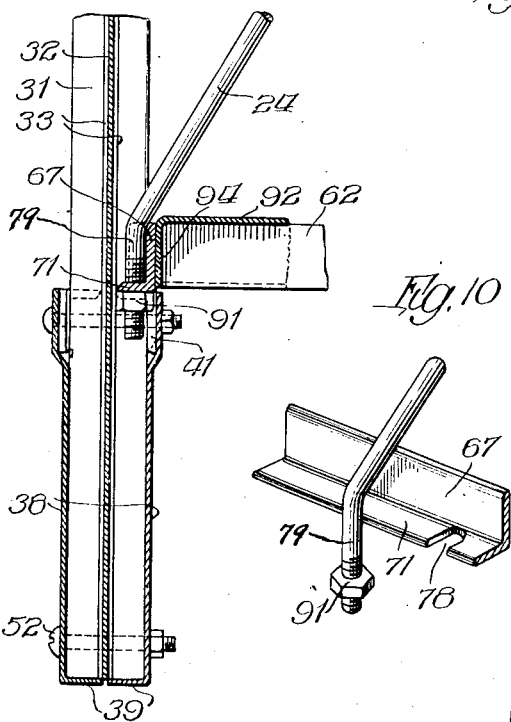
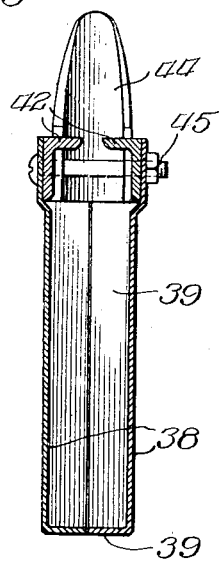
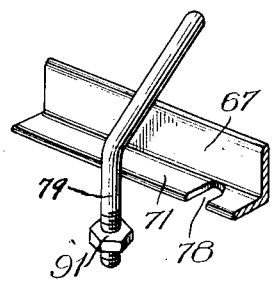
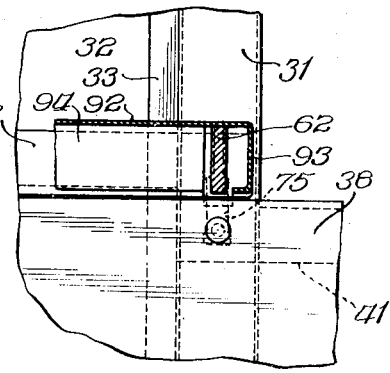
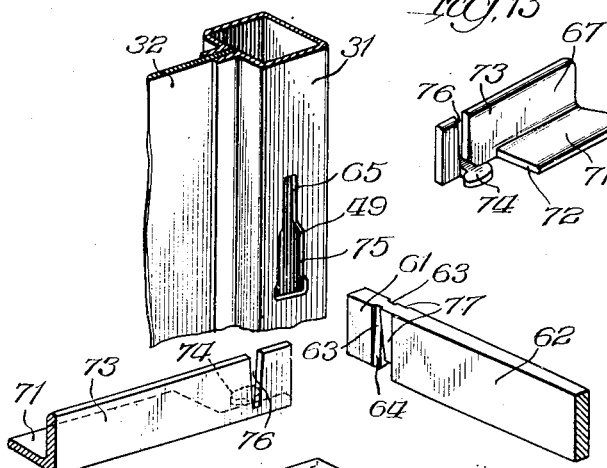
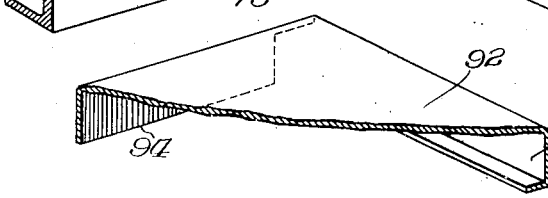

Jan. 15, 1929.  W. N. VANCE  1,698,974
BAR RACK
Filed Feb. 4, 1920  5 Sheets-Sheet 5
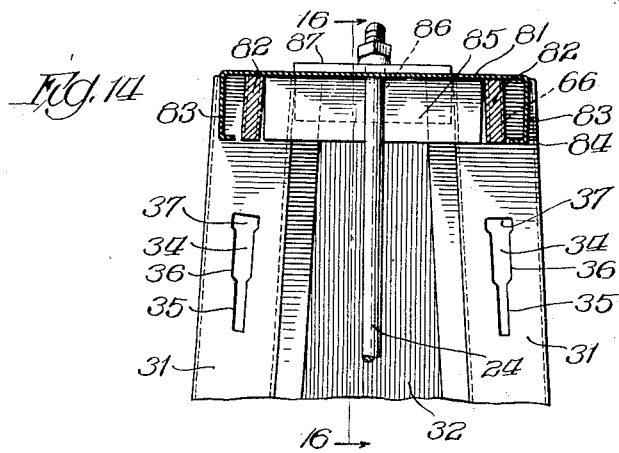
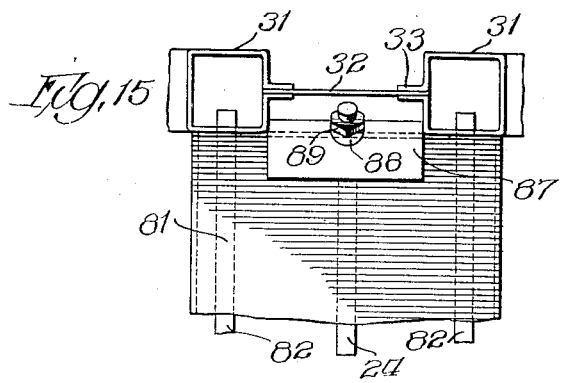
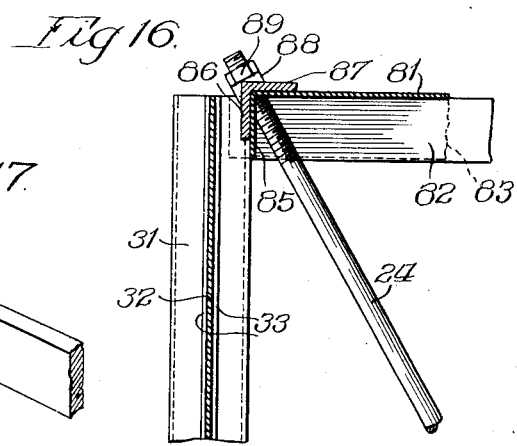
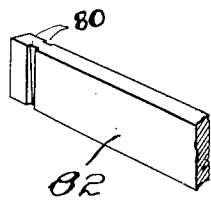

Patented Jan. 15, 1929.

1,698,974

UNITED STATES PATENT OFFICE.

WALTER N. VANCE, OF CHICAGO HEIGHTS, ILLINOIS, ASSIGNOR TO DURAND STEEL LOCKER COMPANY, OF CHICAGO, ILLINOIS, A CORPORATION OF ILLINOIS.

BAR RACK.

Application filed February 4, 1920. Serial No. 356,220.

This invention relates in general to racks for bars, rods, tubes and the like, and has more particular reference to racks of this character which may be provided in knockdown form and readily assembled by the user without requiring the use of particular tools, complicated instructions or the service of skilled mechanics.

A principal object of the invention is the provision of a rack of this character which may be readily assembled and which will be strong and durable in use.

Another important object of the invention is the provision of a bar rack made almost entirely of sheet metal and requiring no cast parts.

Another important object of the invention is the provision of a rack of the character described which may be constructed through the use of relatively little material and without involving expensive operations.

Numerous other objects and advantages of the invention will be apparent as it is better understood from the following description which considered in connection with the accompanying drawings discloses a preferred embodiment of the invention.

Referring to the drawing:

Figure 1 is a perspective view of a bar rack embodying my present invention;

Fig. 2 is a partial front-to-back section;

Fig. 3 is a section taken substantially on the line 3—3 of Fig. 2;

Fig. 4 is an enlarged detail view of one of the bar supporting arms and showing its connection with a frame upright;

Fig. 5 is a section taken substantially on the line 5—5 of Fig. 4;

Fig. 6 is a section taken substantially on the line 6—6 of Fig. 4;

Fig. 7 is a section taken substantially on the line 7—7 of Fig. 4;

Fig. 8 is a section taken substantially on the line 8—8 of Fig. 2;

Fig. 9 is a section taken substantially on the line 9—9 of Fig. 2;

Fig. 10 is a perspective detail showing the connection between the tie rods and bottom cross-supports;

Fig. 11 is a partial section showing the connection of the cross-supports and the longitudinal bearer to the frame upright;

Fig. 12 is a detail view showing the arrangement of the parts shown in Fig. 11 in assembling;

Fig. 13 is a perspective of an end of a cross-support;

Fig. 14 is a transverse sectional view of the upper part of the rack;

Fig. 15 is a partial top plan view of the same;

Fig. 16 is a section taken substantially on the line 16—16 of Fig. 14;

Fig. 17 is a detail of an end of a top bar.

For the purpose of illustrating my invention I have shown on the drawing in Fig. 1 an assemblage or rack comprising two sections embodying my present invention. It will, of course, be understood that other sections may be added or single sections provided.

The rack assemblage shown in Fig. 1 comprises frame uprights 21 connected at their top at 22 and at their bottoms at 23 and braced diagonally by braces 24. Each upright is provided with a base 25 of substantial length and carries adjustably arranged bar supporting arms 26. The parts are all constructed to be assembled in racks of any desired lengths through the mere arrangement of an appropriate number of sections.

Each of the uprights 21 consists of a pair of tubes 31 square in transverse section and the connecting plate 32, the connecting plate may be tapered slightly from its base upwardly and the tubes 31 are provided with flanges 33 extending inwardly in parallelism between which the side edges of the plate 32 may be inserted. The tubes are preferably formed by bending sheets of metal of appropriate thickness to provide the flanges 33 from the longitudinal edges of the sheet and disposed at the center of a side. The two faces of the tubes 31 located adjacent the side having the flanges 33 are provided with slots 34 arranged at intervals, each of the slots 34 preferably having at the bottom a narrow and slightly tapered part 35 and having immediately thereabove a somewhat wider and also slightly tapered part 36 terminating at its top in an enlarged upper or top portion 37 so that each of the slots 34 may be termed of double key-hole form.

At the bottom of each frame upright is provided a relatively wide supporting base which is comprised of two metal sheets 38 flanged at the ends and bottom at 39 inwardly toward each other. The depth of these flanges is appropriate to permit the lower ends of the tubes 31 to be received between the sheets 38 when they are arranged to dispose the flanges 39 in merely abutting relation. At the top the base is reinforced and constructed to form bar supports at each side.

Referring to Figs. 2 and 3 it will be seen that an angle bar is bent at its center to provide two parallel legs 41, the horizontal flange 42 being interrupted at the center to permit a circular bend 43, in which is secured an upwardly extending correspondingly curved tapered finger 44, this finger being held in place by a bolt 45 extending through the two legs near the curve and also through the finger itself. The vertical portions of the angle leg parts are disposed within and bolted to the top edges of the sheets as indicated at 46 and 47, the bolts 47 passing through the upright tubes. The upright tubes are provided adjacent the legs of the angles in the base with slots 49 which are exactly like the slots 34 except that they are inverted in position as may be seen in Fig. 12. At the inner end the horizontal flanges 42 are also cut away to permit the vertical flanges 41 to extend past the tubes and the bolts 47 are passed through the sides 38 of the base, the angles 41 and slots 49 in the tubes 31 already mentioned and bolts 52 are positioned through the plates 38 and the lower ends of the upright tubes 31. When the structure is in knock-down condition the uprights and the sheets or plates 32 between them form one member and the base another. These parts may be easily assembled by inserting the lower end of the upright section in place and positioning the bolts 47 and 52.

Adjacent uprights or frames are connected together by four bars, two located at the top and two at the bottom. Considering first the bars at the bottom, it will be noted in Fig. 12 that the ends 61 of each bar 62 is provided with oppositely arranged slots 63 providing tapered walls 64 adapted to fit within the upper smaller parts 65 of lower slots 49, the extreme end 61 forming a head within the slot. The two bars at the bottom are inserted and pushed up to desired position. The bars at the top are very like the bars at the bottom, except that each end instead of having the slots 63 and 77 they have merely slots 80 like the slots 63. They are, however, reverse in position and are inserted in upper slots 66 duplicating slot parts 35 of slots 34. Cross connectors or tie rod holding members 67 are positioned at the bottom and each of these consists of an angle member having its horizontal flange 71 cut away at 72 to fit between the tubes and permit the companion flange 73 to extend over in front of the tubes. At each side headed tongues 74 are provided to engage in the lower and larger tapered slot parts 75. The flange 73 is cut away at 76 and slots 77 are provided in the bearers or bars 62 adjacent the slots 63 to permit the tie rod holding members to firmly interlock to the bars 62, the material of each bar between the slots 77 wedgingly engaging in a slot 76. The flange 71 of the tie rod holding member 67 is recessed at 78 to receive the lower end 79 of an appropriate diagonal tie rod. The upper end of the tie rod is held by a reinforce or shelf 81 carried on the upper bearers or bars 82. This shelf has flanges 83 at its sides which are preferably returned at their lower edges at 84 to adjacent the lower surfaces of the bars 82. At each end of a flange 85 extends down between the bars 82 and is provided with an aperture 86 at the center of the bend between it and the shelf body. A heavy metal angle 87 extends over this bend and is provided with an aperture boss 88, the aperture of the boss registering with the aperture 86. The end of the tie rod extends through the boss and nuts 89 and 91 are provided upon the ends of the tie rods to draw the structure tightly together. A similar shelf 92 is provided at the bottom and rests upon the bottom bars 62, this shelf having side flanges 93 like the flanges 83 of the top shelf and having end flanges 94 disposed behind the vertical flanges 73 of the lower tie rod holding members 67.

The bar or rod supports 26 are arranged at desired intervals upon the uprights as may be seen upon viewing Fig. 1. These bar or rod supports engage in the slots 34 and can be easily positioned and moved to their locations.

Each comprises a stout angle iron having a horizontal flange 96 cut away at the center as indicated at 97 and the vertical flange bent to a circular curve 98 to provide two angle iron parallel legs. The horizontal flange 96 is also cut away at the ends of the angle at 99 to permit the vertical flanges 101 to extend past the tubes 31. In cutting away the ends of the flanges 96, tongues 102 are left to enter within the upper slot 37 and engage within the upper tapered portions 36 of the slots at opposite sides of the tube. An upwardly extending finger 103 is positioned in the curved central part 98 of each arm and is held in position by a bolt 104. A metal sheet is bent to permit its edges to be disposed alongside the top edges of the angle legs and also to permit its body to form a supporting brace. To this end the metal sheet is bent up at each side on lines of bend 105 extending across the sheet. At the top edges the sheet is riveted at the front at 106 to the outer end of the angle loop and at 107 adjacent the ends of the legs. These last mentioned rivets 107 are provided with enlarged inwardly extending tails 108 adapted to enter into the lower slots 35. The lower edges of the vertical flanges of the legs at the slots are slit to provide a part 109 which is also bent in to fit into these slot parts 35 so that there is a three-point engagement at each slot. The central or under part 111 of the metal sheet is cut back at 112 at its end adjacent the tube and the wings or vertical parts 113 are provided with apertures 114 for receiving outwardly extending lugs 115 upon a bearing plate 116 which rests against the tube when the bar or rod supporting arm is in position.

These arms have sufficient elasticity to permit the ready insertion of the tongues 102 in the slots and the removal of the tongues therefrom in assembling, dismantling or altering the structure.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A rack, comprising uprights, metal sheets embracing the bottoms of said uprights and extending out at the sides, an angle member cut away at its center and bent to dispose its ends adjacent said upright and fixed to said sheet metal members.

2. A rack, comprising uprights, metal sheets embracing the bottoms of said uprights and extending out at the sides, an angle member cut away at its center and bent to dispose its ends adjacent said upright and fixed to said sheet metal members, and having an upwardly extending finger at the point of bend.

3. A rack, comprising uprights, metal sheets embracing the bottoms of said uprights and extending out at the sides, a plurality of angle members cut away at their centers and bent to dispose their ends adjacent said uprights and fixed to said sheet metal members, said angle members extending in opposite direction from said uprights, and having upwardly extending fingers at the points of bend.

4. A rack, comprising uprights, bar or rod supporting arms engaged therewith, each of said arms comprising a metal member bent to loop form and engaged at its end in said upright, and a sheet metal member disposed beneath said loop member and having its sides bent up and engaged with the legs of said loop.

5. A rack, comprising uprights, bar or rod supporting arms engaged therewith, each of said arms comprising a metal member bent upon itself to loop form and engaged at its end in said upright, and a sheet metal member disposed beneath said loop member and having its sides bent up and engaged with the legs of said loop, an end of said member bearing against an upright.

6. A rack for supporting bars, rods and the like, comprising spaced uprights, means for supporting said uprights from the floor and bar supporting arms extending out from adjacent uprights, each of said arms comprising an angle iron bent or folded substantially intermediate its length to provide an outer doubled or folded portion and two substantially parallel legs, said legs having means constructed and arranged to interlock with an upright.

7. A rack for supporting bars, rods and the like, comprising spaced uprights, means for supporting said uprights upon the floor and bar supporting arms extending out from adjacent uprights, each of said arms comprising an integral metal member folded backwardly or ben substantially intermediate its length, the extremities of the rod being spaced apart and provided with means for attachment to opposite sides of an upright.

8. A rack for supporting bars, rods and the like, comprising spaced uprights, means for supporting said uprights upon the floor, bar supporting arms extending out from adjacent uprights, said arms comprising metal members extending out from one side of an upright and returned to a point of attachment at the opposite side thereof, and means for supporting said arms from a point on the upright beneath the point of attachment of the ends of said bent metal member.

9. A rack for supporting bars, rods and the like, comprising spaced uprights having opposed faces provided with a vertical series of spaced slots in each face, the slots in a series in one face registering with those of the other face, and supporting arms, each comprising spaced apart parallel portions extending out from the sides of said uprights, the inner ends of each parallel portion provided with means adapted for interlocking engagement in said registering slots.

10. A rack for supporting bars, rods and the like, comprising spaced uprights having slots in opposite sides thereof, and a plurality of supporting arms, each supporting arm comprising an integral bar looped substantially intermediate its ends with the ends folded one upon the other and extending substantially parallel, the ends of said parallel portions being constructed and arranged to be engaged in the opposed slots in the uprights, each of said arms having a bearing adapted to engage an upright intermediate its opposite sides.

11. A rack for supporting bars, rods and the like, comprising spaced uprights having slots in the opposite sides thereof, a plurality of supporting arms, each supporting arm comprising an integral member folded upon itself substantially intermediate its length, so as to provide a looped outer portion and parallel portions, the ends of said parallel portions being arranged to be supported in opposed slots in the uprights, and sheet metal supporting braces secured to the parallel portions of said arms and arranged to support the latter from a point on the uprights beneath the points of support of the ends of the arms.

12. A rack for supporting bars, rods and the like, comprising spaced uprights having slots in opposite sides thereof, looped arms extending out from said uprights and having their opposite ends supported from opposed slots in the uprights, sheet metal supporting braces secured to the sides of said arms and supporting the latter from a point on the uprights beneath the points of support of the ends of the arms, and a bearing member carried by the lower part of said braces and bearing against said uprights.

13. A rack, comprising hollow uprights arranged in pairs and slotted at their opposite sides, longitudinal connectors wedgingly engaged in the slots of corresponding uprights of different pairs at the top and bottom, cross-connectors wedgingly engaged with said longitudinal connectors, tie rods for connecting top and bottom cross-connectors, said rods being provided with tightening means for drawing the structure firmly together, arms extending out from the sides of said uprights, and shelves supported on said longitudinal connectors.

14. A knock-down rack, comprising spaced uprights, the opposite faces of each said uprights having vertical series of slots therein, said slots being wider at the top and narrower at the bottom, one slot in each series being inverted relative to the others of its series, bars engaging slots in adjacent uprights, and means engaging inverted slots and other parts of said rack to maintain the rack in rigid assembled position.

15. In a rack the combination of a plurality of rod supporting arms, each of said arms consisting of a metal member bent upon itself, the ends thereof being adapted for attachment to an upright and uprights for supporting said arms comprising a base, a spacing plate and square tube members secured thereto having a plurality of arm securing slots in opposite sides thereof, said uprights being spaced apart and secured in fixed relation by means having interlocking relation with said uprights.

16. A rack for supporting bars, rods, and the like, comprising spaced uprights having slots arranged in the side faces thereof, and arms extending out from said uprights, each arm having end members separated and arranged past the side faces of said uprights and engaging in said slots near the top of the arm, and a member connecting said arm ends and extending down therebeneath and engage the front face of said upright.

17. A rack for supporting bars, rods, and the like, comprising spaced tubular uprights having slots in opposite side faces thereof, arms extending out from said uprights, each said arm having spaced end parts arranged on the sides of a tubular upright and engaging in the slots thereof near the top of the upright, and a member extending down from the sides of the arm and engaging the front face of said upright a substantial distance below the points of engagement of the ends of said arm with said upright.

18. In a rack assembly, the combination of two uprights, each upright comprising a pair of tubes substantially square in transverse section, the adjacent sides of each of said tubes being connected to a plate, said connecting plate being tapered slightly from the base of the tubes in a direction longitudinally of the tubes, whereby to provide two upstanding tapering uprights, cross members supporting said uprights in vertical position, and a plurality of bar supporting arms detachably mounted in said uprights and extending laterally therefrom.

19. In a rack assembly, the combination of a plurality of uprights, each upright comprising a pair of tubes substantially square in transverse section, said tubes having spaced apart flanges at one side thereof and longitudinally of the tubes and a metal plate fastened between the flanges of each tube so as to rigidly connect the tubes together, said plates being tapered from the base of said tubes and longitudinally thereof to their upper ends, and each of said tubes having on opposed faces a vertical tier of spaced key slots and a plurality of arms, each arm having opposed lugs adapted to detachably fasten in the opposed key slots.

20. In a rack assembly, the combination of a plurality of uprights, each upright consisting of a pair of tubes substantially square in cross section, the adjacent sides of the two tubes being rigidly connected by a plate and relatively wide supporting base members for said uprights, each base member consisting of two metal sheets flanged at the ends and bottom inwardly toward each other, the depth of said flanges being such as to permit the lower ends of the tubes to be received between the sheets so that the sides of said tubes abut the metal sheets of the supporting base and means for connecting the sheets and tubes together, with cross members for supporting said uprights in vertical position and a plurality of bar supporting arms carried by the uprights.

21. In a rack assembly, the combination of two base members consisting of spaced metal sheets, two uprights, each comprising spaced tubes substantially rectangular in cross section and joined together by a metal plate, said spaced tubes and metal plate having their lower ends disposed within the spaced apart sides of the metal sheets, the upper portion of said metal sheets forming the base member extending laterally, and a bracket member comprising two spaced angle bars, the inner ends of which are arranged in the lateral extension of the spaced plates of the base, the opposed sides of each tube having a series of key slots therein having relatively narrow and relatively wide portions, a detachable fastening plate passing through said spaced basal plates, said spaced arms of the supporting bar and through the wider portions of said key slots to hold said parts in assembled position, cross connectors disposed between the two tubes, each cross connector having a tongue adapted to engage in key slot and provided with a recess intermediate its length, a pair of bars having opposed slots providing tapering walls adapted to fit in the narrow portions of the key slots and a shelf member disposed on each bar and a tie rod having a threaded portion passing the recess in said connector and a nut on said rod disposed below said recess for holding said tie rod to said connector, each of said shelf supporting bars having inclined faces positionable in cut-outs formed in said connectors.

22. In a rack assembly, the combination of an upright having opposed walls provided with a series of spaced key slots, a supporting rack arm consisting of an angle iron folded intermediate its length to provide loop arcuate outer portion and two parallel sides, the inner ends of which are provided with two laterally extending lugs adapted to fasten in the opposed key slots and an upwardly extending finger having an arcuate or curved basal portion fitting within the arcuate outer portion of the supporting arm and a fastening member passing through the arcuate walls of the supporting arm and upstanding finger for fastening the finger in position.

WALTER N. VANCE.